United States Patent
Fries et al.

(10) Patent No.: US 9,398,049 B2
(45) Date of Patent: Jul. 19, 2016

(54) METHOD AND DEVICE FOR SECURELY TRANSMITTING DATA

(75) Inventors: Steffen Fries, Baldham (DE); Maik Seewald, Nürnberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 183 days.

(21) Appl. No.: 13/505,251

(22) PCT Filed: Sep. 2, 2010

(86) PCT No.: PCT/EP2010/062833
§ 371 (c)(1),
(2), (4) Date: Jun. 12, 2012

(87) PCT Pub. No.: WO2011/051028
PCT Pub. Date: May 5, 2011

(65) Prior Publication Data
US 2012/0260088 A1 Oct. 11, 2012

(30) Foreign Application Priority Data
Oct. 30, 2009 (DE) .................. 10 2009 051 383

(51) Int. Cl.
*H04L 9/00* (2006.01)
*H04L 29/06* (2006.01)

(52) U.S. Cl.
CPC ........... *H04L 63/168* (2013.01); *H04L 63/0428* (2013.01); *H04L 63/12* (2013.01)

(58) Field of Classification Search
None
See application file for complete search history.

(56) References Cited

U.S. PATENT DOCUMENTS

| 7,243,366 B2 | 7/2007 | Medvinsky et al. | |
| 7,523,491 B2 * | 4/2009 | Dosa Racz et al. | 726/11 |
| 7,661,129 B2 * | 2/2010 | Panasyuk et al. | 726/10 |
| 7,984,157 B2 | 7/2011 | Panasyuk et al. | |
| 2003/0093694 A1 * | 5/2003 | Medvinsky et al. | 713/201 |
| 2003/0115448 A1 * | 6/2003 | Bouchard | 713/153 |
| 2005/0198380 A1 | 9/2005 | Panasyuk et al. | |
| 2005/0257257 A1 * | 11/2005 | O'Connor et al. | 726/11 |
| 2006/0190999 A1 * | 8/2006 | Chen et al. | 726/11 |
| 2008/0010676 A1 * | 1/2008 | Dosa Racz et al. | 726/11 |
| 2008/0189781 A1 * | 8/2008 | Pathak et al. | 726/12 |

FOREIGN PATENT DOCUMENTS

| CN | 1631000 A | 6/2005 |
| CN | 1874323 A | 12/2006 |
| DE | 602004010703 T2 | 11/2008 |
| DE | 10 2009 051 383.3 | 10/2009 |

(Continued)

OTHER PUBLICATIONS

H. Englert et al., "IEC 61850 Substation to Control Center Communication—Status and Practical Experiences from Projects", IEEE Bucharest Power Tech Conference, Jun. 2009, pp. 1-6.

(Continued)

*Primary Examiner* — Michael R Vaughan
(74) *Attorney, Agent, or Firm* — Slayden Grubert Beard PLLC

(57) ABSTRACT

Cryptographic methods are used at the application level, unlike known methods using point-to-point connections that can only be sufficiently secured at the transport level. Integrity protection and confidentiality protection of data are implemented at the application level for use in network technology.

11 Claims, 10 Drawing Sheets

(56) References Cited

FOREIGN PATENT DOCUMENTS

| EA | 009997 | 6/2008 |
|---|---|---|
| WO | 2005/047991 A2 | 5/2005 |
| WO | WO 2005047991 A2 * | 5/2005 |

OTHER PUBLICATIONS

S. Hong et al, "Evaluating Security Algorithms in the Substation Communication Architecture", International Conference on Scalable Computing and Communications, The 8th International Conference on Embedded Computing; Sep. 2009, pp. 314-318.

N. Liu et al., "A Security Mechanism of Web Services-based Communication for Wind Power Plants", Power and Energy Society General Meeting—Conversion and Delivery of Electrical Energy in the 21st Century, IEEE, 2008, Jul. 2008, pp. 1-7.

D. Dzung et al., "Security for Industrial Communication Systems", Proceedings of the IEEE, vol. 93, No. 6, Jun. 2005, pp. 1152-1177.

Office Action for DE 10 2009 051 383.3-31; dated Jun. 10, 2010.

International Search Report for PCT/EP2010/062833; mailed Nov. 17, 2010.

Office Action mailed Jan. 3, 2014 in corresponding Chinese Application No. 201080048696.5.

Office Action mailed Feb. 21, 2014 in corresponding European Application No. 10754447.0.

Office Action mailed Aug. 4, 2014 in corresponding Russian Patent Application No. 2012122190/08(033705).

* cited by examiner

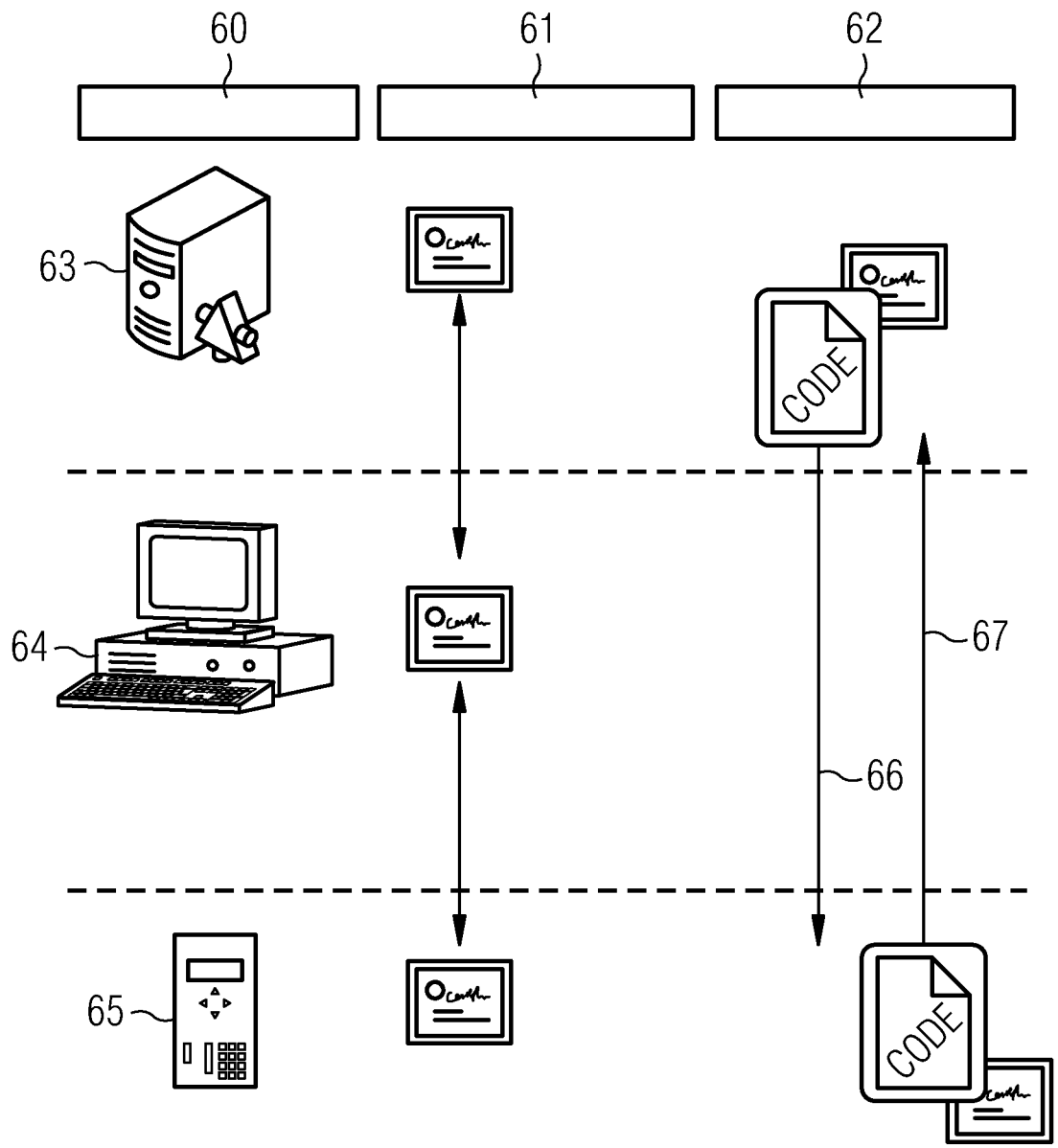

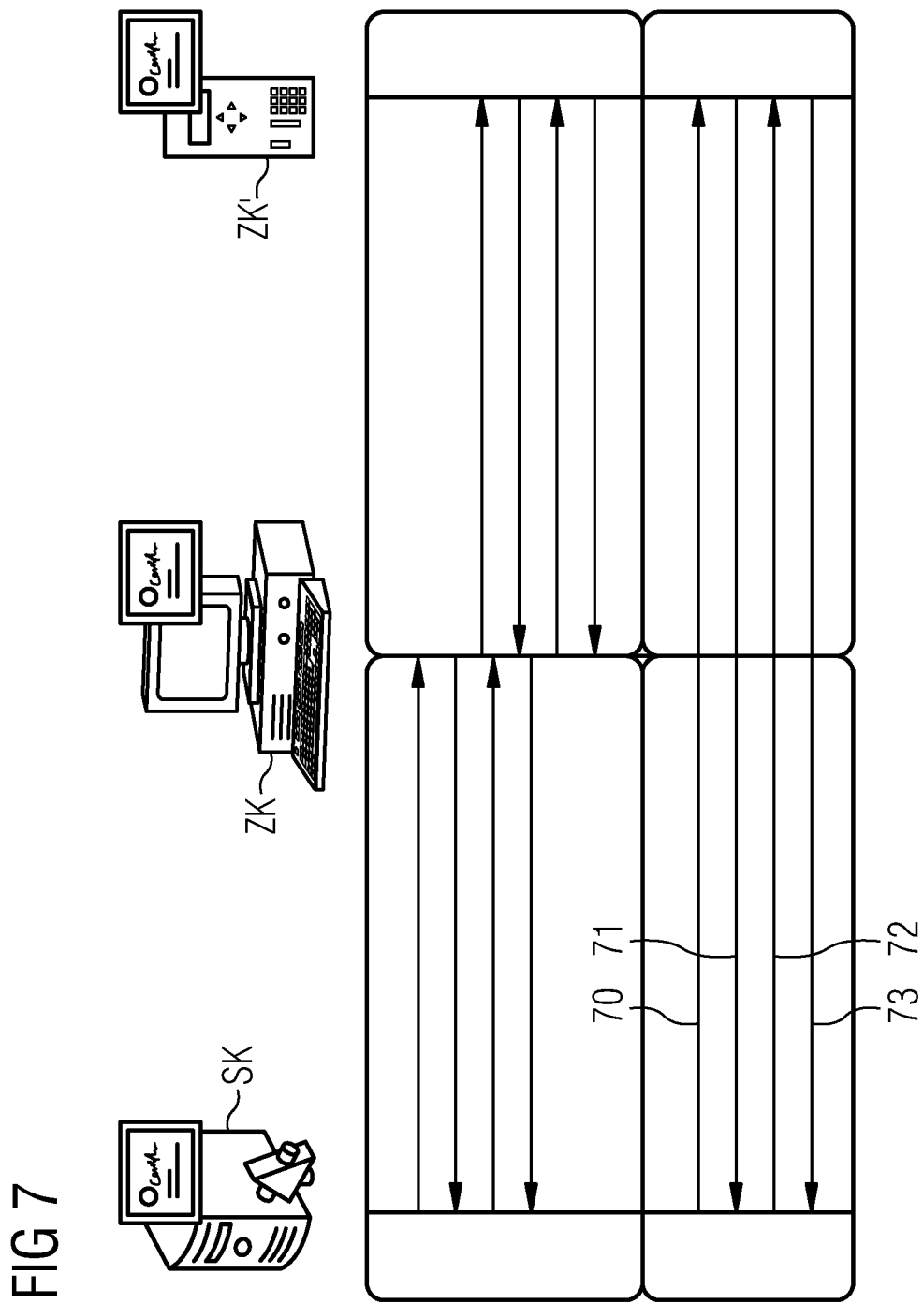

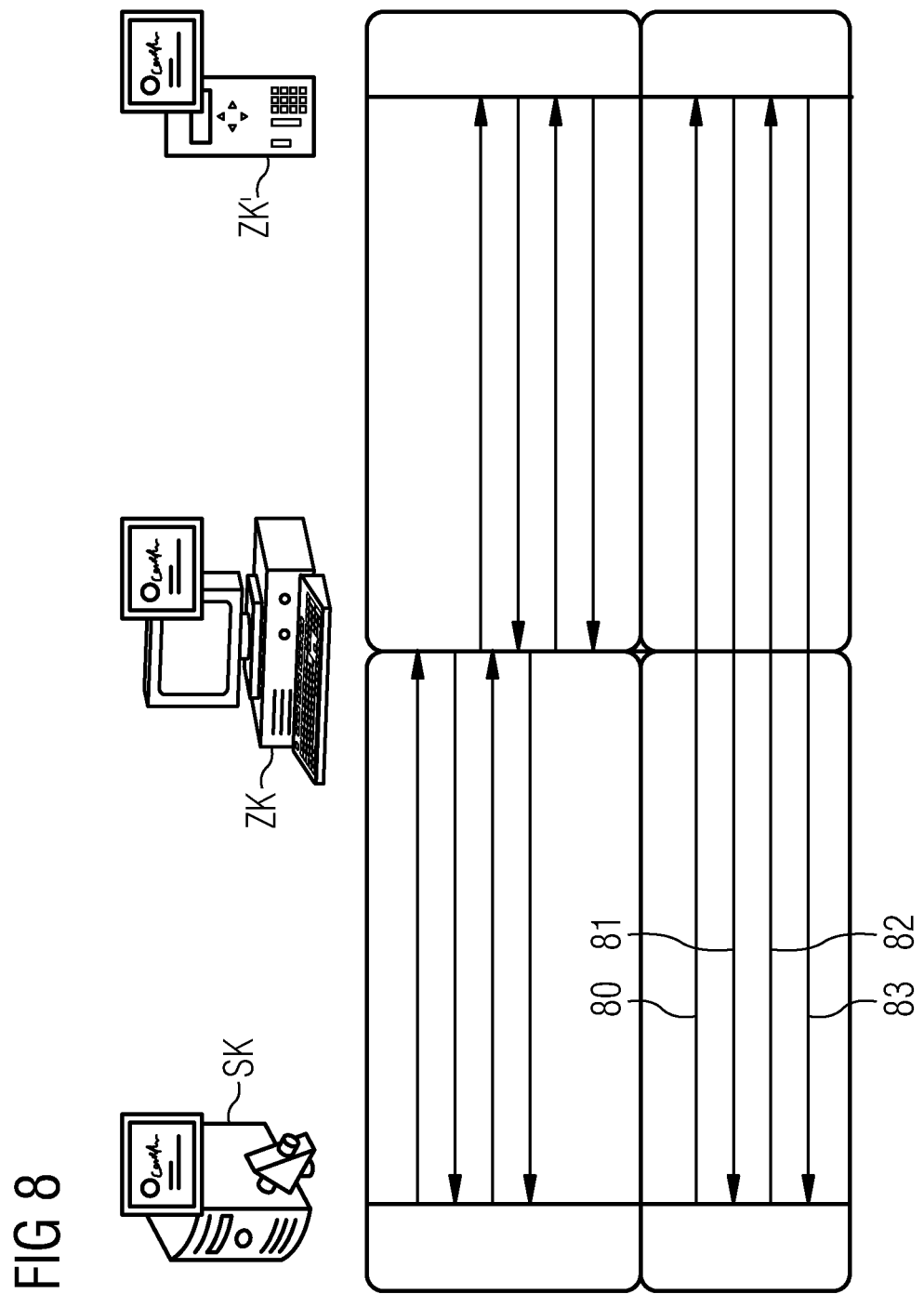

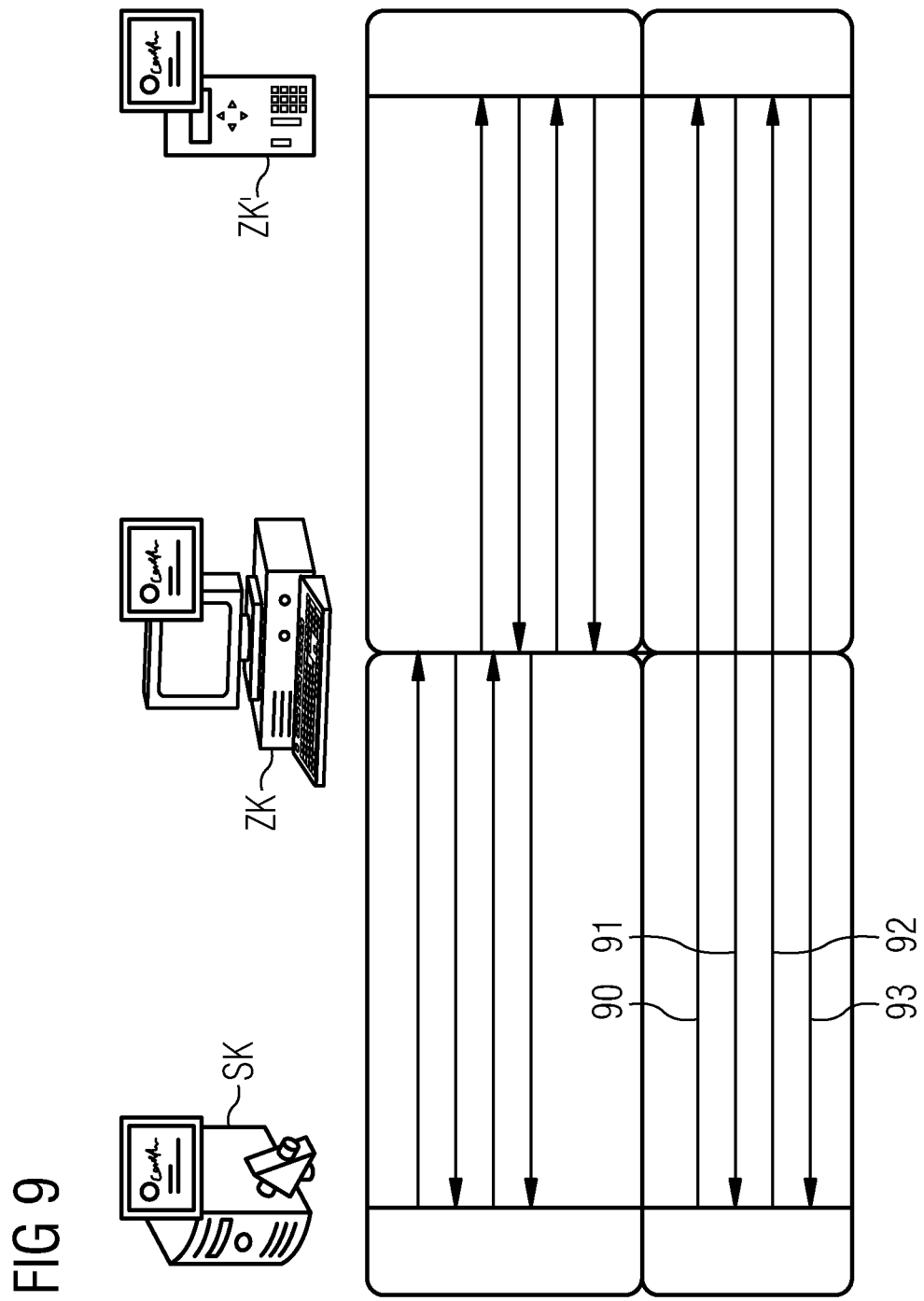

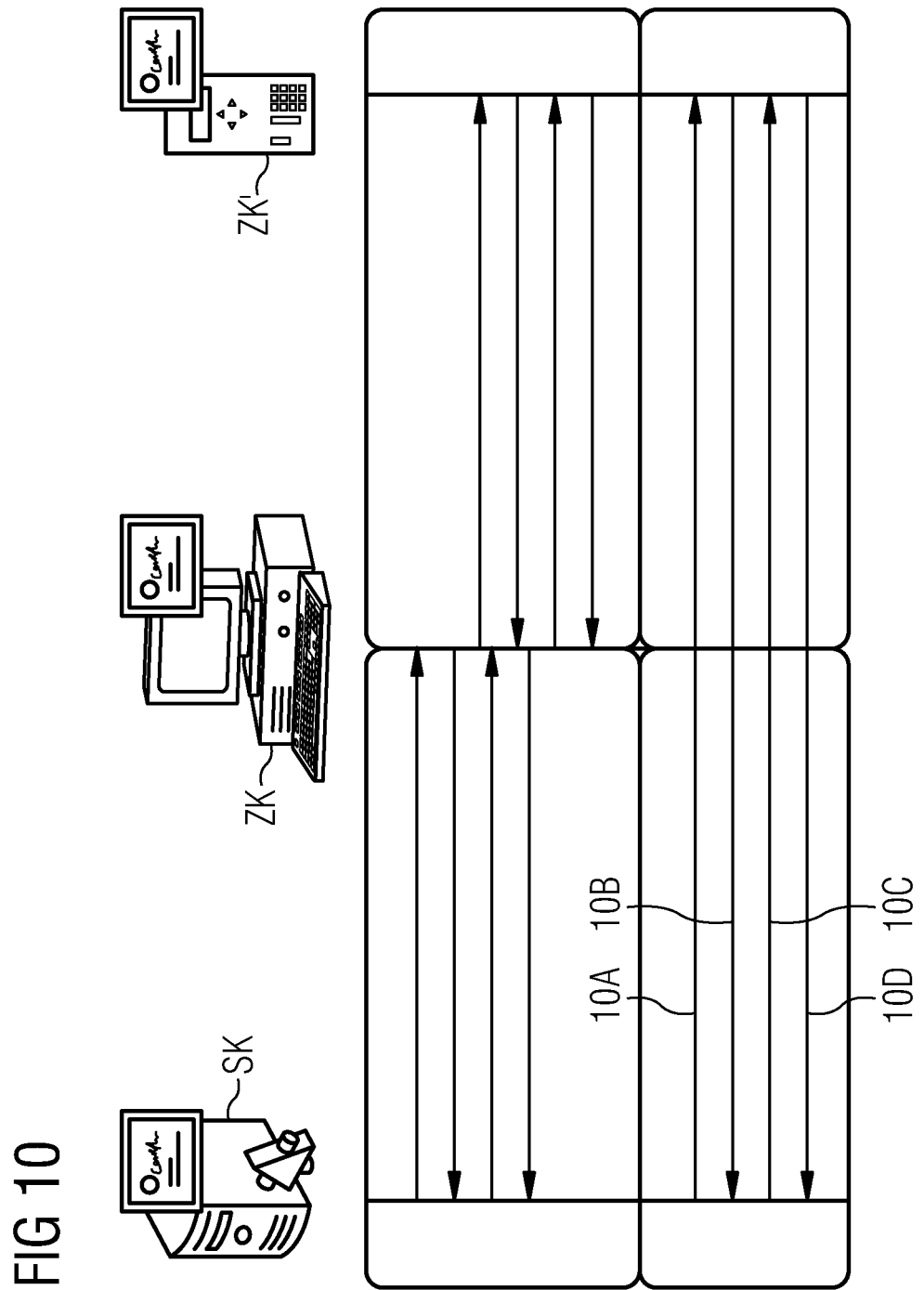

METHOD AND DEVICE FOR SECURELY TRANSMITTING DATA

CROSS REFERENCE TO RELATED APPLICATIONS

This application is the U.S. national stage of International Application No. PCT/EP2010/062833, filed Sep. 2, 2010 and claims the benefit thereof. The International Application claims the benefits of German Application No. 102009051383.3 filed on Oct. 30, 2009, both applications are incorporated by reference herein in their entirety.

BACKGROUND

Described below is a method within network technology for ensuring, inter alia, integrity protection and confidentiality protection of data and, in particular, a method for the secure transmission of data. Also described below is a corresponding device for the secure transmission of data, a computer program product which initiates the performance of the method for secure transmission of data and a data store which stores the computer program product.

In modern communications technology, confidential data are often transmitted worldwide by data connections via heterogeneous networks. It is of particular importance that the data are protected with respect to the completeness and the content thereof. It is also to be ensured that the data are transmitted securely, that is, that on the transmitting side, receipt of the data by the correct receiver and, on the receiving side, transmission of the data by the correct sender is ensured.

For this purpose, known methods provide a variety of authentication possibilities. The process of authentication is generally the process of proving an identity. During this process, typically messages are exchanged between a checking unit and a device that is to be authenticated. If the exchanged messages are intercepted by a hacker, the hacker can feign a false identity using the intercepted messages. The authentication can serve, for example, for the reliable recognition of a device, for example, a sensor or a battery. In the case of client-server communication, also, checking the identity of the client or of the server may be necessary.

In known methods, authentication is often carried out using a challenge-response process. A "challenge message", which is formed, for example, dependent upon a random number, is transmitted to the device. Using a secret cryptographic key, the device then calculates a second value, which is designated a "response message". The response message is sent back to the sender of the challenge, which then checks the response for correctness. Since only an original product or an original device can calculate a correct response message, an original product or an original device can thus be reliably distinguished from a counterfeit.

In known authentication processes, the necessity often exists for checking a device not only locally, but also remotely, via a communication site, for example via the internet, a mobile radio link or other data connection. This necessity exists particularly in the case of remote maintenance of the device. During remote checking of an identity, the problem often exists that an intermediate entity can read messages and use the measures to feign a false identity. This attack scenario is also known as man-in-the-middle attack.

For the transfer of real-time process data and control information between devices and applications, the manufacturing-message-specification protocol, also called MMS, is known. In the context of automation technology, particularly for use in the energy industry, MMS can be used for controlling field devices. MMS can be used via various further protocols, for example TCP/IP. On the application layer of the MMS stack, the ISO Association Control Service Element protocol, also called ACSE, is used. ACSE can be used, for example, for establishing application associations between the application entities and in order to determine the identity and the context of the associations. An Application Association is defined, in this context, as a cooperative relationship between two application entities. A relevant context may be an explicitly defined set of Application Service Elements or ASE.

In the fields of automation and energy technology, MMS can be used for transmitting commands directly between two end points, which is identified below as case 1. There are also scenarios in which MMS is not transmitted in a peer-to-peer connection, that is, where only one transport connection hop is present, but via a plurality of transport connection hops, which is identified below as case 2, in which, for example, a substation controller is linked in. The TCP/IP connection can be secured on the transport connection hops by, for example, TLS.

FIG. 1 shows the transmission of commands between two end points as in a known method. In the drawing, components 10 are arranged vertically. The components concerned are the control center 13, a substation controller 14, also known as a "substation control unit" and a field device 15. Also arranged vertically are the transport security mechanisms 11. These are, for example, certificates, which are shown vertically beneath the transport security mechanisms 11 in FIG. 1. An MMS message flow 12 is also shown in FIG. 1. The arrow 16 indicates case 1, in which commands are used directly between two end points. The arrow 17, on the other hand, indicates case 2, in which commands are transmitted via a plurality of hops, also designated "intermediate components".

From a security standpoint, MMS offers the possibility of performing authentication at the start of a connection. However, this is subject to the limitation that authentication should only occur at the start of a communication connection, but that no secure application-layer session concept exists which ensures that the same peers communicate with one another from the start to the end of the session. This is of particular importance in case 2, as per arrow 17 since, in case 1, as per arrow 16, this requirement can only be ensured by using TLS. The security connections established on the transport layer should be matched to the security connections on the application layer.

Furthermore, Role-Based Access Control or RBAC can also be used. Certificates and private keys can be utilized in this context.

It is also known from conventional methods that MMS supports the possibility of authentication of peers through definitions in ISO-IEC 62351. The following is specified in part 4 of this standard as A-profile security:

Peer Entity Authentication
AARQ
AARE

Peer entity authentication denotes authentication of communication components, AARQ stands for Application Association Request and AARE stands for Application Association Response. For authentication of the sender, for example, the following source text can be used within a peer entity authentication:

---

Authentication-value ::= CHOICE {
  charstring [0] IMPLICIT GraphicString,

-continued

```
    bitstring [1] IMPLICIT    BIT STRING,
    external [2] IMPLICIT     EXTERNAL,
    other [3] IMPLICIT        SEQUENCE {
        other-mechanism-name MECHANISM-
    NAME.&id({ObjectSet}),
        other-mechanism-value MECHANISM-NAME.&Type
        }
    }
    STASE-MMS-Authentication-value {iso member-body
usa(840) ansi-tl-259-1997(0)
    stase (1) stase-authentication-value(0) abstractSyn
tax(1) version(1)}
    DEFINITIONS IMPLICIT TAGS ::= BEGIN
    --EXPORTS everything
    IMPORTS
    SenderId, ReceiverId, Signature, SignatureCertifi-cate
    FROM ST-CMIP-PCI {iso member-body usa(840)
    ansi-t1-259-1997(0) stase(1)
    stasepci(1) abstractSyntax(4)
    version1 (1)};
    MMS-Authentication-value ::= CHOICE{
        certificate-based [0] IMPLICIT SEQUENCE {
            authentication-Certificate [0] IMPLICIT
            &SignatureCertificate,
            time [1] IMPLICIT        GENERALIZED-
    TIME,
            signature [2] IMPLICIT
            &SignedValue
        },
        ...}
    END
```

At the start of a connection, AARQ and AARE messages are exchanged between subscribers and, in the process, cryptographic data are transported. Among other things, a time stamp is added and it is checked in a time window of 10 minutes whether a corresponding time stamp has already been received. Not all the messages of the connection have their integrity protected at application layer.

Also known are various methods which enable authentication of a message or a plurality of messages, for example, http Digest Authentication.

In conventional methods, network security protocols are also used in order to protect IP-based communication cryptographically. In this process, authentication of the communication partners is carried out both one-sided and mutually. Often-used protocols that undertake authentication of a communication partner are known as SSL, TLS or IKE for IPsec. The authentication of a communication partner, in particular an http server via SSL or TLS is carried out by a digital certificate. This certificate contains, apart from the public key of the server, information on the server, in particular the designation thereof, such as a name, a DNS name or an IP address.

Also known from conventional methods is the Kerberos protocol, with the aid of which authentication and authorization can be realized via a third trustworthy party. Kerberos is based on the use of symmetrical keys.

FIG. 2 illustrates the authentication service Kerberos according to a conventional method. Kerberos is a distributed authentication service or network protocol which was developed for public and unsecured computer networks, such as the Internet. According to the Kerberos system, the authentication is undertaken by a trustworthy third party, for example, a Kerberos server.

According to the Kerberos method illustrated in FIG. 2, first a user N makes a request for a Ticket-Granting Ticket from a Kerberos server KS by a request message or a R-TG-T. A ticket is an authorizing message with which the respective owner of the message is given access to the server S. Subsequently, the Kerberos server KS transmits a ticket T and a Ticket-Granting Session Key TGSK to the user N. In order to transmit both the messages ticket T and Ticket-Granting Session Key TGSK, the Kerberos server KS has a Key Distribution Service KDS. The key distribution service KDS communicates by a data connection with a database DB.

Next, the user N requests a Service-Grant-Ticket SGT, for which purpose, the Kerberos server KS accesses a Ticket-Granting Server TGS. The ticket-granting server TGS then transmits a ticket message T and a Session Key SK to the user N. Dependent upon the received message, the user N creates a Request Service message RS and transmits the message to a further server S. Dependent upon a check of the Request Service message RS, the server S transmits a Server Authentication message to the user N.

A further example of a network protocol according to a conventional method is SAML, which is known as Security Assertion Markup Language. In contrast to Kerberos, in SAML, asymmetrical methods can also be used.

Generally, in conventional methods, for example, in the MMS mechanism, at the application layer, only one authentication takes place. Consequently, conventional methods do not provide any integrity protection and confidentiality protection for data at the application layer. Point-to-point connections are secured only at the transport layer. Conventional methods to not teach a definition of a session concept for information security at an application layer making use of already existing mechanisms.

SUMMARY

It is therefore an aspect to provide a method and a device for secure transmission of data.

Accordingly, a method for secure transmission of data is provided which includes the following:
provision of data connections from different start components, via at least one intermediate component, to a common target component;
grouping together of the intermediate components to one intermediate component, depending on cryptographic information; and
transmission of the data from the start components, via the grouped intermediate component, to the target component.

Transmission of data can be considered to be secure if the data are, inter alia, protected as to integrity and confidentiality. Data can be any type of information units, such as are exchanged on the internet. Data can also be exchanged in packets or partitioned. In this regard, data can be modulated in a digital and/or analogue manner. Consequently, the data can also be signals that are transmitted.

The provision of a data connection can be carried out, for example, by a routing table, a method call, a remote method call and/or, generally, with a message exchange. It is also possible to provide data connections by reading data connections from a data memory. Consequently, the provision of data connections can involve naming a data path or the creation of a data line between two components. A data connection can be provided, for example, between a control center, a substation controller and/or a field device. For example, a data connection can be provided between a start component and an intermediate component as well as between an intermediate component and a target component. Consequently, at the physical level, two data connections are provided, wherein logically, a data connection is provided between a start component and a target component.

The different start components, which can include at least one intermediate component and the common target component, can include at least one further component, wherein one component can be present as a technical device, a component, a computer system, a network device, a software unit, a software module, a software class, a software package and/or a plurality of further components. In particular, at least one start component can be present as a control center, an intermediate component can be present as a substation controller and/or one target component can be present as a field device. Depending on the configuration of the start components, the intermediate components and/or the target components, a suitable data connection can be selected. In a mobile application scenario, the data connection can be, for example, a wireless connection which is implemented via an air interface. It is also possible for the data connection to have further components in addition to the start component, the intermediate component and/or the target component.

Grouping together the intermediate components depending on cryptographic information into one intermediate component can be implemented, for example, according to a session protocol. It is thus not necessary, given multiple transmission of data from a start component, via an intermediate component, to a target component, to create a special data connection between the intermediate component and the target component in each case. According to one aspect, it is advantageous, for each transmission of data, to provide a transport connection between the start component and the intermediate component, although for a plurality of data transmissions from the intermediate component to the target component, precisely one data connection needs to be provided. Consequently, according to one aspect, it is made unnecessary for a plurality of data connections to be created between the intermediate component and a target component. Consequently, grouping together of the intermediate components to one intermediate component, according to a session protocol, makes it possible for just one single authentication of the intermediate component or of the target component to be required.

Grouping together the intermediate components to one intermediate component by routing is also possible. It is possible, from a plurality of intermediate components, to select precisely one and to address this selected intermediate component using the network addresses of the respective other intermediate components that have not been selected. Consequently, data from the different start components is not transmitted to a plurality of intermediate components, but to precisely one selected intermediate component, the one selected intermediate component establishing a data connection to the single common target component.

Performing routing can include diversion of data packets, assignment of new network addresses to intermediate components and/or updating of a routing table.

The grouping together of the intermediate components can be carried out dependent on cryptographic information. The provision of the cryptographic information can take place, for example, according to conventional methods such as the challenge-response method. In order to provide the cryptographic information, it may be advantageous to adapt a relevant data format to be suitable to encode the cryptographic information. Consequently, data which are provided according to this adapted data format can provide the cryptographic information.

Generating the cryptographic information can be carried out by a start component. It is herein advantageous to generate the cryptographic information by, for example, the challenge-response method. The challenge-response method used can also be extended or adapted with further cryptographic information. The cryptographic information can be a generated token and/or Nonce Information. Nonce Information is suitable for providing a random number and/or a pseudo-random number. Furthermore, the cryptographic number can be a checksum. An extension of the MMS data format is suitable for encapsulating the cryptographic information and further data that are to be transmitted. A plurality of further data formats which can be adapted in suitable manner are known to a person skilled in the art.

Transmission of the data from the start component via the grouped together intermediate components to the target component is suitable for transmitting the data while preserving integrity and confidentiality. According to one aspect, by transmission via the grouped together intermediate component, the number of intermediate components is restricted to exactly one. Consequently, the aforementioned man-in-the-middle attack on the data connection between the intermediate component and the common target component is made difficult.

A method is therefore provided which offers a cryptographically secured session concept at the application layer. The assignment of different contexts via the same transport connection is therefore made possible. A data connection, for example, a TLS connection, once established, can be used for different sessions at the application layer. This is advantageous, in particular, for multi-hop scenarios. A hop denotes transmission of data from one component to an adjacent component at the transport layer. In the case of single-hop scenarios also, the method is advantageous if a plurality of applications or a plurality of users communicate from one device with another device and use only a single transport connection, for example, a TLS transport connection.

The defining of universal cryptographic information is also enabled, favoring the introduction of further safety services. Particularly hybrid cryptographic methods offer a starting point, since even asymmetrical key material is used for authentication. Step-wise transmission of asymmetrical protection via a hybrid protection through to complete asymmetrical protection according to one aspect can be realized. The hybrid approach has advantages, particularly when setting up security relationships, since the static administration of paired shared secret information is thus avoided and dynamically negotiates the information at the session beginning.

In an embodiment of the method, the different start components, the intermediate components and/or the target components are provided in an automation network.

This has the advantage that the transmission of data can be carried out in automation networks by the method provided. Automation networks are used in a plurality of technical fields, particularly in the energy industry, for example, for operating power plants.

In another embodiment of the method, the transmission of data is carried out by an extended Manufacturing Messaging Service protocol.

This has the advantage that an already existing technology and, therefore, previously implemented infrastructures can be re-used.

In another embodiment of the method, the grouping together of the intermediate components and/or the transmission of the data is carried out by at least one message exchange.

This has the advantage that, as a result of the message exchange, grouping together can be carried out dependent on cryptographic information according to a session protocol and/or negotiation as to which intermediate components should be grouped together.

In another embodiment of the method, the message exchange is carried out between the different start components, the intermediate components and/or the target components.

This has the advantage that a plurality of components can communicate dynamically with one another.

In another embodiment of the method, the message exchange implements at least one symmetrical and/or asymmetrical cryptographic method.

This has the advantage that previously known technologies can be re-used for implementing the method.

Furthermore, the use of a plurality of cryptographic methods, which can be symmetrical, asymmetrical or hybrid, is possible.

In a further embodiment of the method, the message exchange is carried out according to a Shared Key process, an http-Digest Authentication process, a Challenge-Response process, a Keyed Hash process, a Hash Function, a Diffie-Hellman process and/or a digital signature process.

This has the advantage that a plurality of methods can be used for implementing the method. In particular, the above-named processes enable secure data transmission at the application layer.

In another embodiment of the method, at least one exchanged message includes a reference to an item of Nonce Information, a random number, a pseudo-random number, a command, an identity of a sender, an identity of a receiver, a time stamp and/or a sequence number.

This has the advantage that, for example, a Next Nonce process which allows the content of a transmitted message to be linked to a preceding message by an item of Nonce Information can be implemented. Furthermore, as a result of the exchanged messages, a plurality of session protocols can be implemented.

In another embodiment of the method, at least one exchanged message contains the cryptographic information.

This has the advantage that the cryptographic information can be exchanged for implementation of cryptographic processes, for example, an exchange of keys between the individual components.

In another embodiment of the method, at least one exchanged message contains a checksum.

This has the advantage that the content of the exchanged messages can be checked for integrity.

In another embodiment of the method, the message exchange is carried out dependent on an encryption protocol.

This has the advantage that the messages can be exchanged in encrypted manner. Furthermore, previously implemented infrastructures which act according to a particular encryption protocol can be re-used.

In another embodiment of the method, the grouping together of the intermediate components is carried out by at least one routing operation, an allocation of network addresses, an application of a session protocol, the establishment of a secure data connection, transmission of a command, transmission of an item of cryptographic information and/or transmission of a confirmation message.

This has the advantage that grouping together of the intermediate components can be carried out by a plurality of procedures and, in particular, by a combination of a plurality of procedures.

In another embodiment of the method, the grouping together of the intermediate components is carried out at the application layer.

This has the advantage that, inter alia, integrity protection can be implemented independently of the transport layer.

The problem is further solved by a device for secure transmission of data. According to this, a device for secure transmission of data is provided, particularly for carrying out one of the aforementioned methods includes:
- a provision unit for providing data connections from different start components via at least one intermediate component in each case, to a common target component;
- a grouping unit for grouping together the intermediate components, dependent on an item of cryptographic information, to one intermediate component; and
- a transmission unit for transmitting the data from the start components via the grouped together intermediate components to the target component.

Furthermore, a computer program product is provided which initiates the performance of a pre-determined method and a data store which stores the computer program product.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 6 is a flow diagram of an embodiment of a method for secure transmission of data;

FIG. 7 is a sequence diagram of an embodiment of a method for secure transmission of data;

FIG. 8 is a sequence diagram of a further embodiment of a method for secure transmission of data;

FIG. 9 is a sequence diagram of a further embodiment of a method for secure transmission of data;

FIG. 10 is a sequence diagram of a further embodiment of a method for secure transmission of data;

DETAILED DESCRIPTION OF THE PREFERRED EMBODIMENT

In the figures, the same or functionally similar elements are identified with the same reference signs, where not otherwise indicated.

Figure 3:
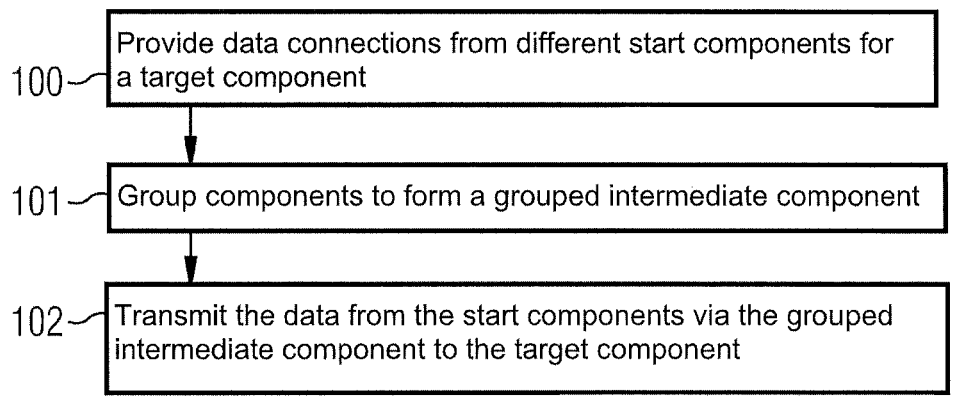
FIG. 3 is an activity diagram of an embodiment of a method for secure transmission of data.

FIG. 3 shows an activity diagram of an embodiment of a method for secure transmission of data. The method includes the following:
- provision 100 of data connections from different start components via at least one intermediate component to a common target component, in each case;
- grouping together 101 the intermediate components, dependent on an item of cryptographic information, to an intermediate component; and transmitting 102 the data from the start components via the grouped intermediate component to the target component.

The method set out above can be carried out iteratively and/or in another sequence.

Figure 4:
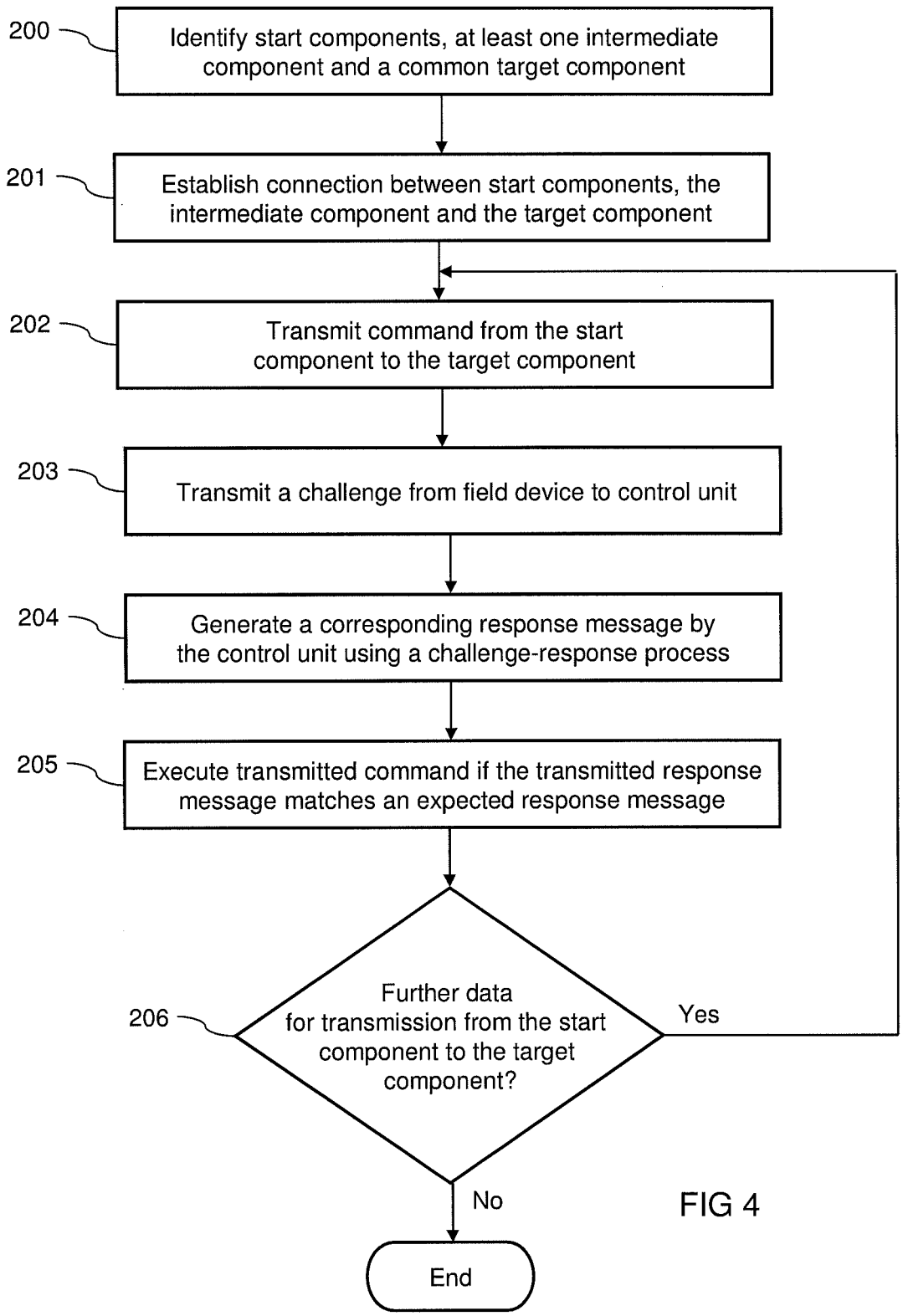
FIG. 4 is a detailed activity diagram of an embodiment of a method for secure transmission of data.

FIG. 4 shows a detailed activity diagram of a method for secure transmission according to an embodiment.

First, at 200, identification of different start components, at least one intermediate component and a common target component takes place.

Therefore, in the first operation 200, selection of those components which are to communicate, i.e. exchange data with one another via a data connection, takes place. Identification of the communicating components can also be carried out implicitly, by a method call from one component to another component. For example, using a remote method call, a control device calls a function of a field device, by which it is specified that the control device is to communicate with the field device by a logical data connection. At the physical layer, it is now identified that the method call of the control unit must be fed via a substation or an intermediate component. Consequently, in operation 200, a start component, specifically a control unit, an intermediate component, specifically a substation unit, and a field device are all identified.

In a subsequent operation 201, a connection is established between the start component identified in operation 200, the intermediate component and the target component. The operation 201 can include, for example, the establishment of a TLS session. Establishment of a TLS session can involve the exchanging of a plurality of messages from different start components to the at least one intermediate component and from the intermediate component to the common target component. Consequently, after performance of operation 201, a logical connection is provided between the start component and the target component.

In a further operation 202, a command is transmitted from the start component to the target component. For example, a control command can be transmitted from the start component to the target component.

In the present exemplary embodiment, the method is used within an automation network for energy technology. The start component is therefore a control unit which controls a field device which is provided, for example, in a power station. In the present exemplary embodiment, at 201, the command "close power circuit" is transmitted to the field device. Consequently, the control unit transmits a parameter to the field device which indicates that the control device should close a power circuit. Alternatively, at 202, a remote method call takes place from the control unit to the field device.

In a subsequent operation 203, the field device transmits a "challenge" to the control unit. A challenge is a request message which is generated, for example, by a challenge-response process.

In a subsequent operation 204, the control unit generates a corresponding response message which is created, for example, by a challenge-response process. The calculated response message can be transmitted to the field device together with the command. Consequently, the field device is notified that a particular generated response relates to a particular command. The field device therefore recognizes what response is involved, since the control unit can transmit a plurality of control messages relating to different commands and/or because a plurality of start components each transmit at least one response relating to a particular command.

At 205, the transmitted response message is checked and, if comparison of the transmitted response message reveals that the transmitted response message matches an expected response message, the transmitted command is executed. Furthermore, in 205, confirmation of the execution of the command is carried out by a confirmation message and a further item of cryptographic information is transmitted by the target component to the start component. It is herein possible that the transmission of the cryptographic information during operation 205 comprises an item of "Next Challenge" or "Next Nonce" information. It is thus possible, during a further transmission of data from the start component to the target component, that operation(s) 203 and/or 204 are no longer carried out, since the operations can be carried out by iterative performance of operation(s) 204 and/or 205. It is also possible, in each of the operations 202, 203, 204 and 205, to transmit further parameters, that is, further commands, further challenge messages, further response messages and/or further confirmation messages. The transmitted cryptographic information can also comprise, for example, a cryptotoken.

In a further embodiment of the method for secure transmission of data, iterative execution of the operation(s) 202 and/or 203 takes place. For example, in 202, a command and cryptographic information is transmitted by the start component to the target component and, in 203, a confirmation message and a further item of cryptographic information is transmitted from the target component to the start component. Consequently, on a repeat execution of operation 202, a new command is transmitted together with a new item of cryptographic information from the start component to the target component. Subsequently, in 203, transmission of a confirmation message together with a further item of cryptographic information takes place.

In a last, optional operation 206, a check is made as to whether further data are present for transmission from the start component to the target component. If it is ascertained in 206 that further data are present for transmission, branching to one of the previously performed operations 202, 203, 204 or 205 takes place.

The operations described can contain further substeps and can be carried out iteratively and/or in a different sequence.

Figure 5:
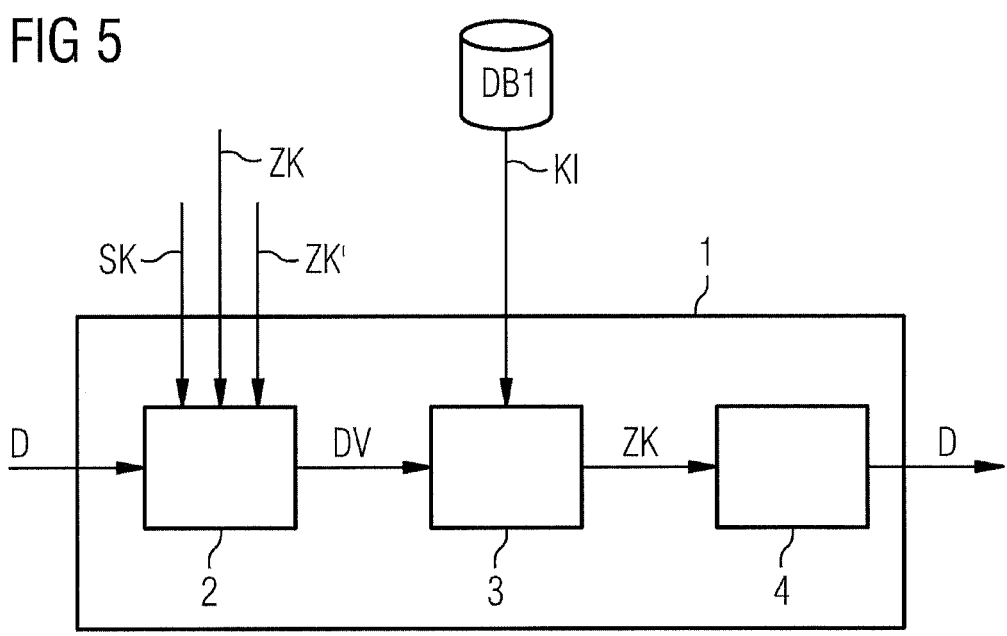
FIG. 5 is a block diagram of an embodiment of a device for secure transmission of data.

FIG. 5 shows a device 1 for secure transmission of data D according to one embodiment. The device 1 for secure transmission of data D comprises:
  a provision unit 2 for providing data connections DV from different start components SK via at least one intermediate component ZK, in each case, to a common target component ZK';
  a grouping unit 3 for grouping together the intermediate component ZK dependent on an item of cryptographic information KI to an intermediate component ZK; and
  a transmission unit 4 for transmitting the data D from the start components SK via the grouped together intermediate component ZK to the target component ZK'.

Further features of a further exemplary embodiment of the device 1 for secure transmission of data D which can only be provided in this further embodiment will now be described. These are therefore optional features.

In the present exemplary embodiment, the provision unit 2 reads the different start components SK, the at least two intermediate components ZK' and the common target component ZK' from the data memory. It is also possible that the provision unit 2 receives the start components SK, the intermediate components ZK and the common target component ZK' provided by a further unit. Furthermore, a data quantity from which a selection of data D is to be transmitted to the target component ZK' is provided to the provision unit 2. The provision unit 2 can, for example, identify data connections DV on the basis of the transmitted start components SK, intermediate components ZK and/or target components ZK', by which data connections DV the data D are to be transmitted. Data connections DV can be logical, physical and/or hybrid data connections DV.

The grouping unit 3 is suitable for grouping a plurality of intermediate components ZK to one intermediate component ZK dependent on an item of cryptographic information KI. For this purpose, it is possible that at least one item of cryptographic information KI is made available to the grouping unit 3. The provision of the cryptographic information KI can take place, for example, by calculation and/or by reading from a data memory DB1. If the intermediate unit ZK has been selected, this information can be transmitted to the transmitting unit 4. The transmitting unit 4 can then initiate transmission of the data D.

FIG. 6 shows a flow diagram according to a method for secure transmission of data according to one embodiment. In the present FIG. 6, a plurality of components 60 are entered vertically, for example, a control unit 63, a substation control unit 64 and a field device 65. For the transmission of data, an application of the TLS protocol with mutual authentication on a hop-to-hop basis using certificates is performed on a transport security layer 61. A flow of MMS messages 62 takes place on the application layer.

Figure 1:
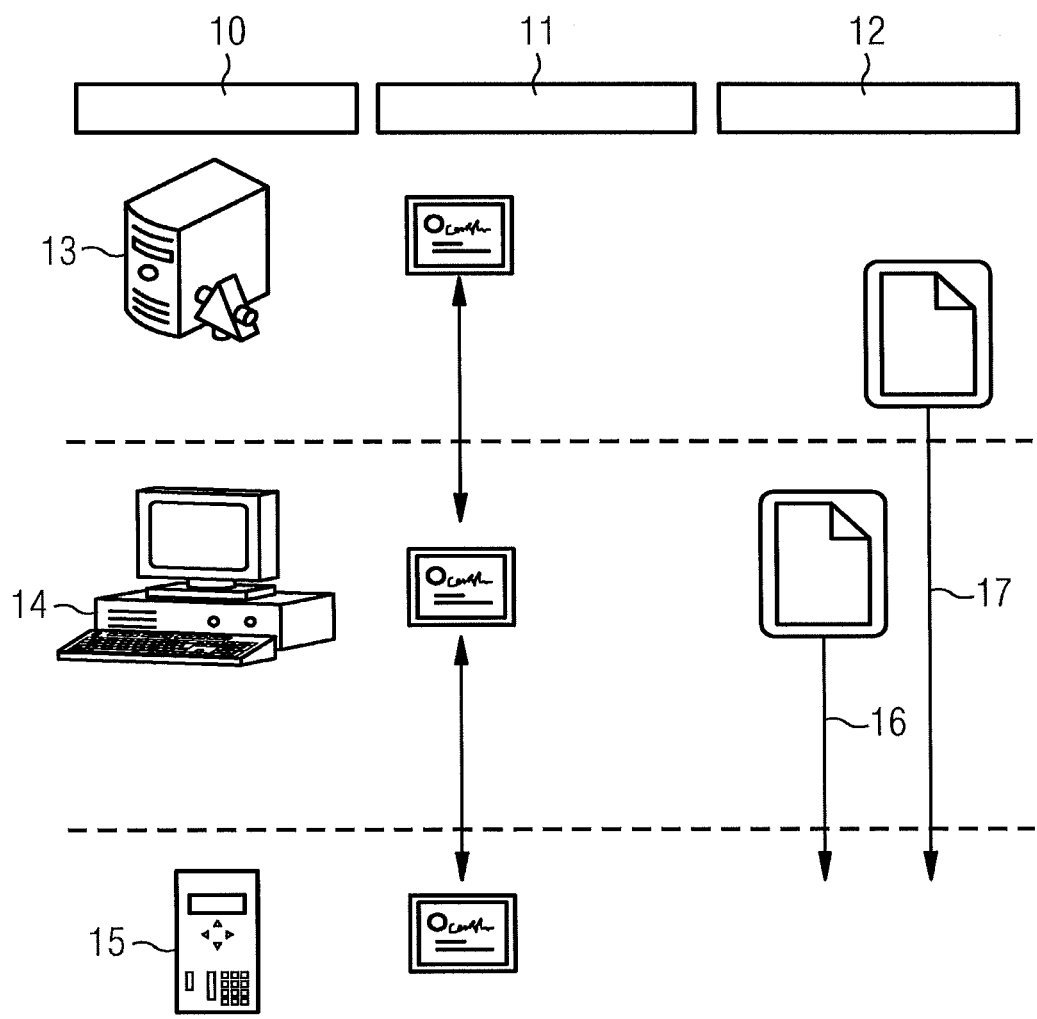
FIG. 1 is an illustration of the transmission of commands between two end points according to a known method.
Figure 2:
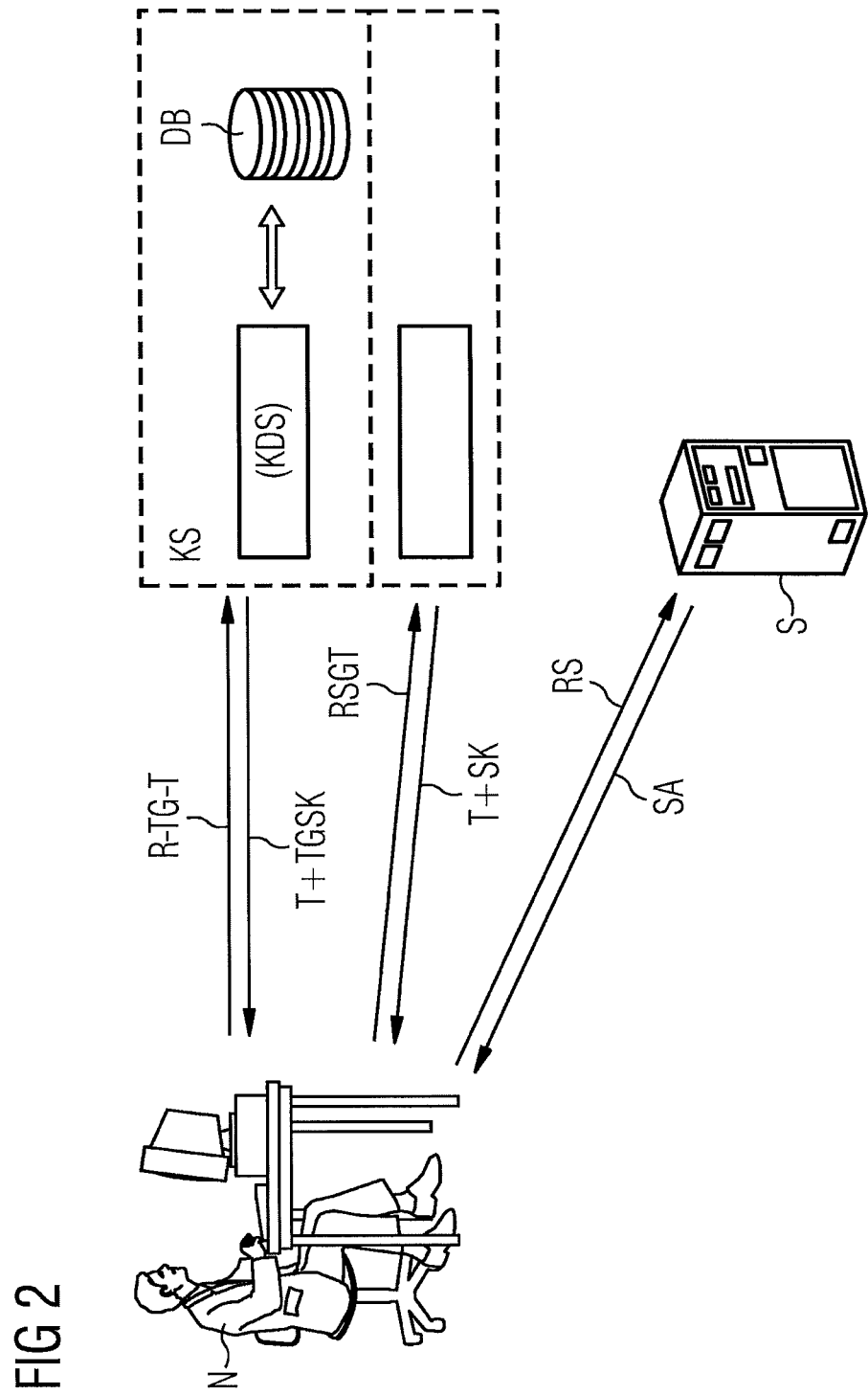
FIG. 2 is an illustration of an authentication service according to a known method.
Figure 12:
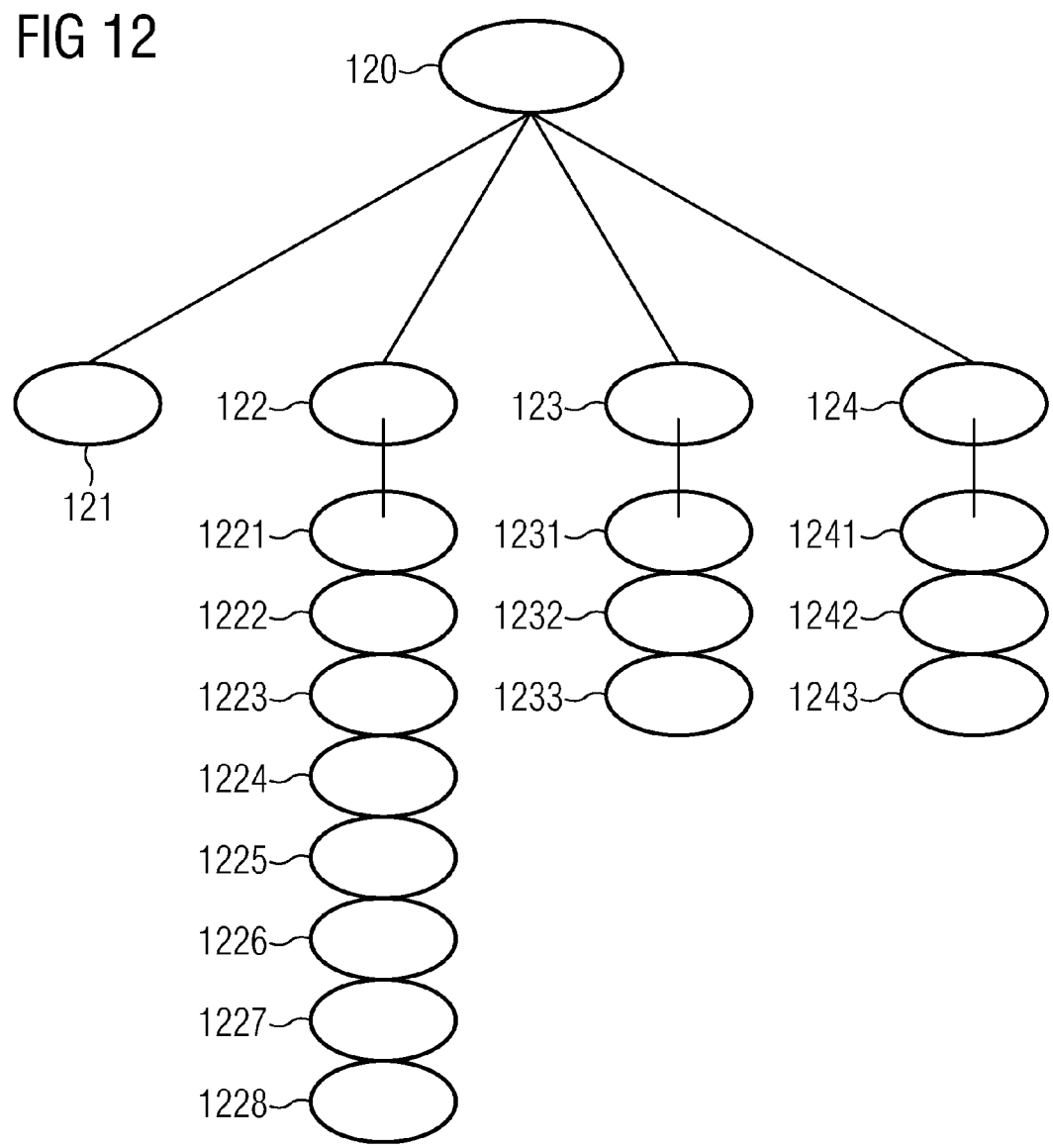
FIG. 12 is a schematic structure of a cryptographic item of information, as can be used in an embodiment of a method for secure transmission of data.

Compared with the exemplary embodiment according to FIG. 1, in the exemplary embodiment according to the present FIG. 6, a message exchange is performed by the control unit 63 and the field device 65. The control unit 63 can be, for example, at least one start component SK, and the field device 65 can be, for example, a target component ZK'. The message exchange can be performed, for example, by an MMS handshake using AARQ and/or AARE messages according to the MMS specification. For this purpose, a Diffie-Hellman process can be used. The individual messages exchanged between the start component 63 and the target component 65 can be protected with a digital signature. For example an AARQ message can be extended with a cryptotoken. An exemplary structure of a cryptotoken is shown in FIG. 12. A further message exchange can be performed using AARE messages, which can also be extended with a cryptotoken. The message exchange from the start component 63 to the target component 65 is identified in FIG. 6 with an arrow 66. A message exchange from the target component 65 to the start component 63 is identified in FIG. 6 with an arrow 67.

In the present embodiment according to FIG. 6, a message exchange is carried out between the start component 63 and the target component 65, wherein a message exchange, as identified, for example, in FIG. 1 with the arrows 16 and 17, is not necessary. Therefore, establishment of a session takes place, at the application layer, directly between two communicating end-to-end connections. The probability of a man-in-the-middle attack, as is possible according to FIG. 1, is minimized by the method.

FIG. 7 shows a sequence diagram of an embodiment of a method for secure transmission of data according to one embodiment. In FIG. 7, the transmission of data takes place from at least one start component SK, via an intermediate component ZK to a field device ZK' at the physical layer. For this purpose, a connection is established at the transport layer, for example, by a TLS session TLSS. This is carried out by multiple exchanges of messages between at least one of the start components SK, at least one intermediate component ZK and the common target component ZK'. In the present exemplary embodiment as per FIG. 7, a message exchange 70 takes place which can be represented in accordance with the MMS protocol as follows:

AARQ PDU1 (Command)

An AARQ message is an Application Association Request message. PDU can stand, for example, for Protocol Data Unit, as is known from network technology. The command "command" can be a work instruction to the field device ZK'. In a further message 71, the target component ZK' requests a response from the start component SK by sending a challenge message. This message can be represented in accordance with the MMS protocol as follows:

AARE PDU2 (Challenge)

AARE stands for an Application Association Response message. Calculation of the challenge, that is, the request message, can be carried out by the target component ZK' by a challenge-response process. The start component SK then calculates a response message in relation to the command transmitted in the message 70, and transmits the response in the message 72 back to the target component ZK'. The target component ZK' now checks the response and carries out the transmitted command dependent upon the checking of the response. The message 72 can be represented in accordance with the MMS protocol as follows:

AARQ PDU3 (Command (PDU1), Response)

Since the target component ZK' has carried out the command, the target component ZK' transmits a confirmation message, known as the Acknowledgement ACK, together with a further challenge, also known as a Nonce Message, to the start component SK. This message 73 can be represented in accordance with the MMS protocol as follows:

AARE PDU4 (ACK, Next Nonce)

On renewed transmission of data, rather than carrying out operation(s) 70, 71, 72 and/or 73 again, in the embodiment, the message 72 can be transmitted again, wherein the response now relates to the Next Nonce transmitted in the previously transmitted message 73. Thus, renewed authentication of the command takes place. According to the Nonce Information, binding to the respective preceding message takes place. Thus a session concept is implemented which permits a cryptographic chain-linking of the messages to be prepared at the application layer. Furthermore, the calculation of the response can also contain the actual response message, so that integrity protection can be realized for the messages.

In a further embodiment of the method for secure transmission of data, the approach of HTTP digest authentication is used, wherein the server issues a challenge and the client calculates the appropriate response. In addition, in this context, a Next Nonce mechanism can be used in order to avoid duplication of all the request messages. Using the Next Nonce mechanism, only the first handshake would be duplicated, whilst all further responses from the server side would receive the challenge via the last response. This approach originates from a symmetrical secret, with which the integrity of the messages is protected.

FIG. 8 shows a sequence diagram of a further embodiment of the method for the secure transmission of data. Within the MMS protocol, the following could involve an extended MMS protocol. The start component SK transmits a message to the target component ZK', which can be represented in accordance with the MMS protocol as follows:

AARQ PDU1 (Command, Cryptotoken)

In the present exemplary embodiment, the cryptotoken receives a checksum which was generated by the start component SK. If the transmitted cryptotoken corresponds to an expected cryptotoken, the target component ZK transmits a confirmation message together with the cryptotoken. This can be represented in accordance with the MMS protocol as follows:

AARE PDU2 (ACK, Cryptotoken)

Thus, the target component ZK' has confirmed that the integrity of the transmitted message 80 is assured. If data are repeatedly transmitted from the start component SK to the target component ZK', a further transmission of the message 82 takes place, and this can be represented in accordance with the MMS protocol as follows:

AARQ PDU3 (Command, Cryptotoken)

If the command has been carried out according to the message 82 transmitted by the target component ZK', confirmation and renewed transmission of the cryptotoken from the target component ZK' to the start component SK takes place. This can be represented in accordance with the MMS protocol as follows:

AARE PDU4 (ACK, Cryptotoken)

As an alternative to the renewed transmission of the messages 82 and 83, iterative transmission of the messages 80 and 81 can take place.

In a further embodiment of the method for secure transmission of data, use of a purely symmetrical approach similarly to the H.235.1 process takes place. The H.235.1 process is a known method which is used in real time communication. In the present embodiment, the identity of the sender and receiver as well as the time stamp and the sequence number can be added to all messages.

This approach originates from a symmetrical secret with which the integrity of the messages can be protected. For the purpose of integrity protection, a keyed Hash (HMAC) process with updated Hash functions such as SHA-256, SHA-512 and others can be used.

FIG. 9 shows a sequence diagram of an embodiment of a method for secure transmission of data. Here, in a first message exchange, transmission of the message 90 takes place and this can be represented in accordance with the MMS protocol as follows:

AARQ PDU1 (Command, Cryptotoken, Signed)

This embodiment differs from that shown in FIG. 8 in that a digital signature can be used. However, it is necessary in this case that verification of the signature takes place. Particularly advantageous in the embodiment according to FIG. 9 is that no symmetrical secret is required. The digital signature can be transmitted, for example, by the parameter "signed" of the message 90 from the start component SK to the target component ZK'.

There then follows a transmission of the message 91 from the target component ZK' to the start component SK, and this can be represented in accordance with the MMS protocol as follows:

AARE PDU2 (ACK, Cryptotoken, Signed)

Thus the target component ZK' confirms that the transmitted message comprising the command, the cryptotoken and the signature has been successfully received. If further data are transmitted by the start component SK to the target component ZK', transmission of the messages 92 takes place, and this can be represented in accordance with the MMS protocol as follows:

AARQ PDU3 (Command, Cryptotoken, Signed)

and of message 93, which can be represented in accordance with the MMS protocol as follows:

AARE PDU4 (ACK, Cryptotoken, Signed)

As an alternative to the transmission of the messages 92 and 93, a renewed transmission of the messages 90 and 91 can be initiated.

In a further embodiment of the method for secure transmission of data, use is made of a purely asymmetric approach, similar to H.235.2, H.235.2 being a known method of communication technology. In this embodiment, the identity of the sender and the receiver as well as the time stamp and the sequence number can added to all messages. This approach is based on an asymmetrical key pair with which the integrity of the messages can be protected. For the integrity protection, a digital signature, for example, RSA, elliptical curves and others can be used. Based on the signature, a non-repudiation can be realized as a security service for each message, which can be made a requirement for the support of role-based access methods.

FIG. 10 shows a sequence diagram of a method for secure transmission of data according to an embodiment. Herein, during a message exchange, transmission of a message 10A takes place, and this can be represented in accordance with the MMS protocol as follows:

AARQ PDU1 (Command, Cryptotoken, Signed, DHset)

In the present embodiment, a Diffie-Hellman-Key establishment can be used in a handshake. For this purpose, it may be necessary to transmit the parameter DHset from the start component SK to the target component ZK'. In a subsequent message exchange, a message 10B is transmitted which can be represented in accordance with the MMS protocol as follows:

AARE PDU2 (ACK, Cryptotoken, Signed, DHset)

Subsequently, via the message 100, a method call is transmitted, and this can be represented in accordance with the MMS protocol as follows:

AARQ PDU3 (Command, Cryptotoken, Keyed Hash)

Generation and transmission of the message 10D follows, and this can be represented in accordance with the MMS protocol as follows:

AARE PDU4 (ACK, Cryptotoken, Keyed Hash)

This embodiment concerns a combined execution of the previously described procedure, as described in FIG. 9 and FIG. 8. It is herein advantageous that less computing power is required since repeated verification of a signature can be dispensed with. It is particularly advantageous in the embodiment of FIG. 10 that a new key is generated for every session of the exchange of data.

In the present embodiment of FIG. 10, data integrity is therefore ensured on the basis of a key pair and a digital signature for a first handshake.

In a further embodiment of the method for secure transmission of data, a hybrid approach of H.235.3, being a telecommunications process, is used. In the first handshake, a Diffie-Hellman-key establishment, which is digitally signed with the asymmetric key material, can be used. This approach is based on an asymmetric key pair. This handshake can be realized in the AARQ and AARE messages. Using the Shared Key thus established, integrity protection can subsequently be realized for the messages within the session. This protection can be implemented using HMAC.

Figure 11:
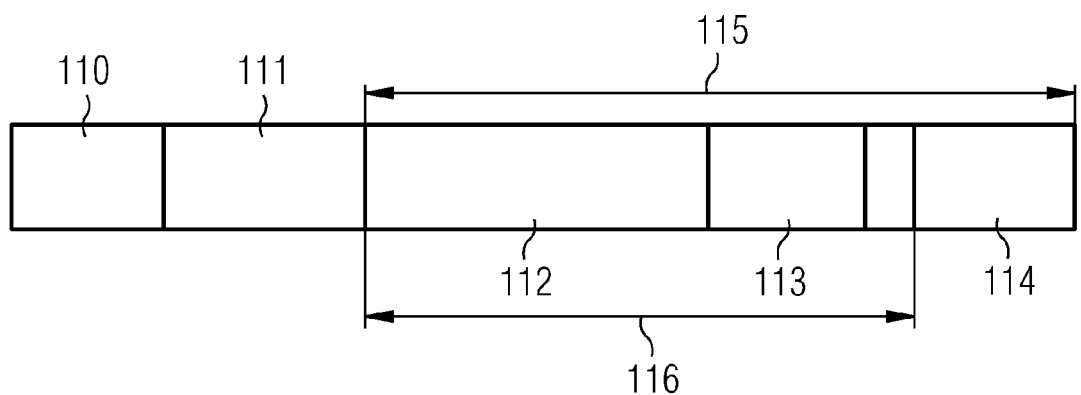
FIG. 11 is message structure of a message which can be used in an embodiment of the method for secure transmission of data.

FIG. 11 shows a possible message structure which can be used in an embodiment of the method for secure transmission of data. The message shown in FIG. 11 can be an extended MMS message which is extended with a cryptotoken 113 and/or a checksum, for example, an MAC 114. The message has an IP header 110, a UDP/TCP header 111, an MMS payload 112, a cryptotoken 113 and/or an MAC 114. The MMS payload 112 can be a useful load. At the application layer, the MMS payload 115, the cryptotoken 113 and the MAC 114 can be designated the useful load, as indicated by the arrow 115.

In the message structure shown in FIG. 11, the essential information for performing the method is encapsulated using cryptotokens. A cryptotoken 113 encapsulates all the essential cryptographic information and can therefore be included equally in all messages. The MAC 114 at the end of the message enables integrity checking of the useful load. A possible definition of a cryptotoken 113 for transport of the necessary cryptographic information can be represented as an ASN.1 tree. An example thereof is shown in FIG. 12.

The cryptotoken 113 can comprise, for example, Nonce Information. Using the message construction shown, the integrity of the MMS payload 112 and/or of the cryptotoken 113 can be ensured, as shown in FIG. 11 by the arrow 116.

FIG. 12 shows a schematic form of the structure of a cryptotoken. A cryptotoken can be defined, for example, by the following source code.

```
cryptoToken ::= SEQUENCE - General purpose/application
specific token
{
    tokenOID            OBJECT IDENTIFIER,
    TokenVals           ClearToken,
    token HASHED OPTIONAL,
    token signed OPTIONAL
ClearToken ::= SEQUENCE - a "token" may contain
multiple value types.
{
    tokenOID            OBJECT IDENTIFIER,
    certificate         TypedCertificate OPTIONAL,
    timeStamp           TimeStamp OPTIONAL,
    SequenceNumber      SequenceNumber OPTIONAL,
    random              RandomVal OPTIONAL,
    dhkey               DHset OPTIONAL,
    receiverID          Identifier OPTIONAL,
    sendersID           Identifier OPTIONAL
}
HASHED ::= SEQUENCE
{
    algorithmOID        OBJECT IDENTIFIER,
    paramS              Params, -- any "runtime" pa- rameters
    hash                BIT STRING
}
signed ::= SEQUENCE
{
    algorithmOID        OBJECT IDENTIFIER
    paramS              Params, -- any "runtime"
parameters
```

```
    signature           BIT STRING
}
DHset ::= SEQUENCE
{
    Halfkey             BIT STRING (SIZE(0..2048)), --
    = g^x mod n
    Midsize             BIT STRING (SIZE(0..2048)), --
n
    generator           BIT STRING (SIZE(0..2048)), -- g
    ...
}
```

The cryptotoken 120 shown in FIG. 12 can correspond, for example, to the cryptotoken 113 shown in FIG. 11.

In the present exemplary embodiment, the cryptotoken 120 can comprise a TokenOID 121, a Clear Token 122, a Hashed Datatype 123 and/or a Signed-Datatype 124. For the sake of a more intuitive understanding, the following table shows the identifications of the reference signs:

| | |
|---|---|
| 120 | cryptoToken |
| 121 | tokenOID |
| 122 | ClearToken |
| 123 | HASHED |
| 124 | signed |
| 1221 | tokenOID |
| 1222 | certificate |
| 1223 | dhkey |
| 1224 | timeStamp |
| 1225 | Sequence Number |
| 1226 | random |
| 1227 | receiver ID |
| 1228 | senders ID |
| 1231 | algorithmOID |
| 1232 | paramS = NULL |
| 1233 | hash |
| 1241 | algorithmOID |
| 1242 | paramS = NULL |
| 1243 | signature |

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for secure transmission of data, comprising:
   providing, by a programmed hardware processor, data connections from different start components via at least one intermediate component to a common target component, in each case, at least one of the different start components, the at least one intermediate component and the common target component are in an automation network;
   grouping together, by the programmed hardware processor and carried out by at least one message exchange at the application layer, intermediate components, dependent upon an item of cryptographic information, to form a grouped intermediate component; and
   transmitting, by the programmed hardware processor, the data by an extended manufacturing-message-specification protocol from the different start components via the grouped intermediate component to the common target component.

2. The method as claimed in claim 1, wherein the at least one message exchange is carried out between at least two of the different start components, the intermediate components and the common target components.

3. The method as claimed in claim 2, wherein the at least one message exchange implements at least one symmetrical cryptographic method and asymmetrical cryptographic method.

4. The method as claimed in claim 3, wherein the at least one message exchange is carried out according to at least one of a Shared Key process, an http-Digest Authentication process, a Challenge-Response process, a Keyed Hash process, a Hash Function, a Diffie-Hellman process and a digital signature process.

5. The method as claimed in claim 4, wherein at least one exchanged message includes a reference to at least one of an item of Nonce Information, a random number, a pseudo-random number, a command, an identity of a sender, an identity of a receiver, a time stamp and a sequence number.

6. The method as claimed in claim 5, wherein at least one exchanged message contains the cryptographic information.

7. The method as claimed in claim 6, wherein at least one exchanged message contains a checksum.

8. The method as claimed in claim 7, wherein the at least one message exchange is carried out dependent on an encryption protocol.

9. The method as claimed in claim 8, wherein said grouping together of the intermediate components is carried out by at least one of a routing operation, an allocation of network addresses, an application of a session protocol, the establishment of a secure data connection, transmission of a command, transmission of an item of cryptographic information and transmission of a confirmation message.

10. A device for secure transmission of data related to an automation network, comprising:
  a programmed hardware processor configured to
    provide data connections from different start components via at least one intermediate component in each case, to a common target component, at least one of the different start components, the at least one intermediate component and the common target component being part of the automation network;
    group together the intermediate components, dependent upon an item of cryptographic information, to one intermediate component, the grouping carried out by at least one message exchange at the application layer; and
    transmit the data, by an extended manufacturing-message-specification protocol, from the start components via the grouped together intermediate components to the common target component.

11. A non-transitory computer readable medium embodying instructions that when executed by a processor perform a method comprising:
  providing data connections from different start components via at least one intermediate component to a common target component, in each case, at least one of the different start components, the at least one intermediate component and the common target component being part of an automation network;
  grouping together intermediate components, dependent upon an item of cryptographic information, to form a grouped intermediate component, the grouping carried out by at least one message exchange at the application layer; and
  transmitting the data, by an extended manufacturing-message-specification protocol, from the start components via the grouped intermediate component to the common target component.

* * * * *